US007401269B2

(12) United States Patent
Hoda et al.

(10) Patent No.: US 7,401,269 B2
(45) Date of Patent: Jul. 15, 2008

(54) SYSTEMS AND METHODS FOR SCRIPTING DATA ERRORS TO FACILITATE VERIFICATION OF ERROR DETECTION OR CORRECTION CODE FUNCTIONALITY

(75) Inventors: Sahir S. Hoda, Dallas, TX (US); Brad F. Bass, Carrollton, TX (US); Nathan D. Zelle, The Colony, TX (US); Anand V. Kamannavar, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 821 days.

(21) Appl. No.: 10/435,147

(22) Filed: May 10, 2003

(65) Prior Publication Data

US 2004/0225932 A1    Nov. 11, 2004

(51) Int. Cl.
*G06F 11/00* (2006.01)
(52) U.S. Cl. ...................................... 714/703
(58) Field of Classification Search ................ 714/703
See application file for complete search history.

(56) References Cited

U.S. PATENT DOCUMENTS

| 4,612,640 | A | | 9/1986 | Mehrotra et al. | |
| 4,999,837 | A | * | 3/1991 | Reynolds et al. | ............ 714/703 |
| 6,539,503 | B1 | * | 3/2003 | Walker | ........................ 714/703 |
| 6,799,287 | B1 | * | 9/2004 | Sharma et al. | ............... 714/703 |
| 6,886,116 | B1 | * | 4/2005 | MacLellan et al. | ........... 714/703 |
| 7,103,824 | B2 | | 9/2006 | Halford | |
| 2004/0225944 | A1 | | 11/2004 | Brueggen | |

OTHER PUBLICATIONS

U.S. Appl. No. 10/435,149, C. M. Brueggen.
Kaneda, Shigeo, et al., "Single Byte Error Correcting-Double Byte Error Detecting Codes for Memory Systems," 1982 IEEE Transactions on Computers (Jul. 1982), vol. C-31, No. 7, pp. 596-602.
Affidavit of Richard W. Adkisson, Feb. 17, 2005, 4 pages.
Morelos-Zaragoza, Robert H., "The Art of Error Correcting Coding." Sony Computer Science Laboratories, Inc. Japan, pp. 33-72, 2002.

* cited by examiner

*Primary Examiner*—Jacques Louis-Jacques
*Assistant Examiner*—John J. Tabone, Jr.

(57) ABSTRACT

In one embodiment, the present invention is directed to a method for inserting errors into data to facilitate validation of an error detection algorithm. The method comprises: receiving a data corruption command for a plurality of bits; determining, from the data corruption command, a plurality of bit fields within the plurality of bits for data corruption; determining a minimum and maximum number of errors for each of the plurality of bit fields; determining a total number of errors to be inserted; inserting the minimum number of errors into each of the plurality of bit fields at random locations; and randomly inserting additional errors into the plurality of bit fields subject to the maximum number of errors until the total number of errors are inserted.

20 Claims, 3 Drawing Sheets

SYSTEMS AND METHODS FOR SCRIPTING DATA ERRORS TO FACILITATE VERIFICATION OF ERROR DETECTION OR CORRECTION CODE FUNCTIONALITY

CROSS-REFERENCE TO RELATED APPLICATIONS

This application is related to commonly assigned and concurrently pending: U.S. patent application Ser. No. 10/435,149, entitled "SYSTEMS AND METHODS FOR PROVIDING ERROR CORRECTION CODE TESTING FUNCTIONALITY," which is incorporated herein by reference.

FIELD OF THE INVENTION

The present invention is directed to validating error detection and/or correction code functionality.

DESCRIPTION OF RELATED ART

Electronic data storage utilizing commonly available memories (such as dynamic random access memory (DRAM)) can be problematic. Specifically, there is a probability that, when data is stored in memory and subsequently retrieved, the retrieved data will suffer some corruption. For example, DRAM stores information in relatively small capacitors that may suffer a transient corruption due to a variety of mechanisms. Additionally, data corruption may occur as the result of a hardware failure such as a loose memory module, blown chip, wiring defect, and/or the like. This type of data corruption is referred to as a repeatable error, since the same physical mechanism repeatedly causes the same pattern of data corruption.

To address this problem, a variety of error correction algorithms have been developed that attempt to recover corrupted data. Error correction code (ECC) algorithms operate by calculating redundant data when payload data is received. When the payload data is stored, the redundant data is stored in association with the payload data. When the payload data and the redundant data are subsequently retrieved, the redundant data is recalculated and compared to the retrieved redundant data. When an error is detected (i.e. the retrieved and recalculated redundant data do not match), the retrieved and recalculated redundant data may be used to correct certain categories of errors. An example of a known ECC scheme is described in "Single Byte Error Correcting-Double Byte Error Detecting Codes for Memory Systems" by Shigeo Kaneda and Eiji Fujiwara, published in IEEE TRANSACTIONS on COMPUTERS, Vol. C31, No. 7, July 1982.

A variety of mechanisms have been utilized in an attempt to ensure that the contemplated ECC algorithms are properly implemented when the ECC algorithms are embedded in hardware. In general, the implementation of an ECC algorithm in hardware may be modeled in software. Various errors may be manually inserted into stored data. The intentionally corrupted data may be provided to a suitable software model to determine whether the ECC algorithm properly corrects the data corruption. This approach assumes that the software model accurately models the eventual implementation in hardware. This assumption may be correct for relatively simple implementations. However, this assumption is not necessarily true for more complex designs because the equivalency of the hardware and software models is difficult to enforce, and/or the software modeling may not allow thorough testing of the ECC algorithm because of performance limitations. Thus, software modeling cannot provide a rigorous validation for all applications. Also, a method for verifying the algorithm in hardware is desired, in order to discover possible manufacturing defects or errors in the hardware synthesis process.

BRIEF SUMMARY OF THE INVENTION

In one embodiment, the present invention is directed to a method for inserting errors into data to facilitate validation of an error detection algorithm. The method comprises: receiving a data corruption command for a plurality of bits; determining, from the data corruption command, a plurality of bit fields within the plurality of bits for data corruption; determining a minimum and maximum number of errors for each of the plurality of bit fields; determining a total number of errors to be inserted; inserting the minimum number of errors into each of the plurality of bit fields at random locations; and randomly inserting additional errors into the plurality of bit fields subject to the maximum number of errors until the total number of errors are inserted.

DETAILED DESCRIPTION

Representative embodiments provide an error scripting language that enables a user to specify the occurrence of errors to validate an ECC algorithm and/or an error detection algorithm. Specifically, the error scripting language may specify a command that causes errors to be corrupted on an identified bus. The error scripting language may further enable a user to identify specific bit fields within the bus to be corrupted. Furthermore, the error scripting language may enable a minimum number of errors and/or a maximum number of errors for occurrence within the identified bit fields. Within these identified constraints, the corrupted bits may then be selected randomly. By providing an error scripting language adapted in this manner, representative embodiments enable a user to possess sufficient control over the occurrence of errors to ensure that the correction of specific types of errors operates as contemplated. Further, by providing a degree of randomization, multiple tests may achieve a greater degree of validation coverage thereby increasing the value of the validation process.

Figure 1:
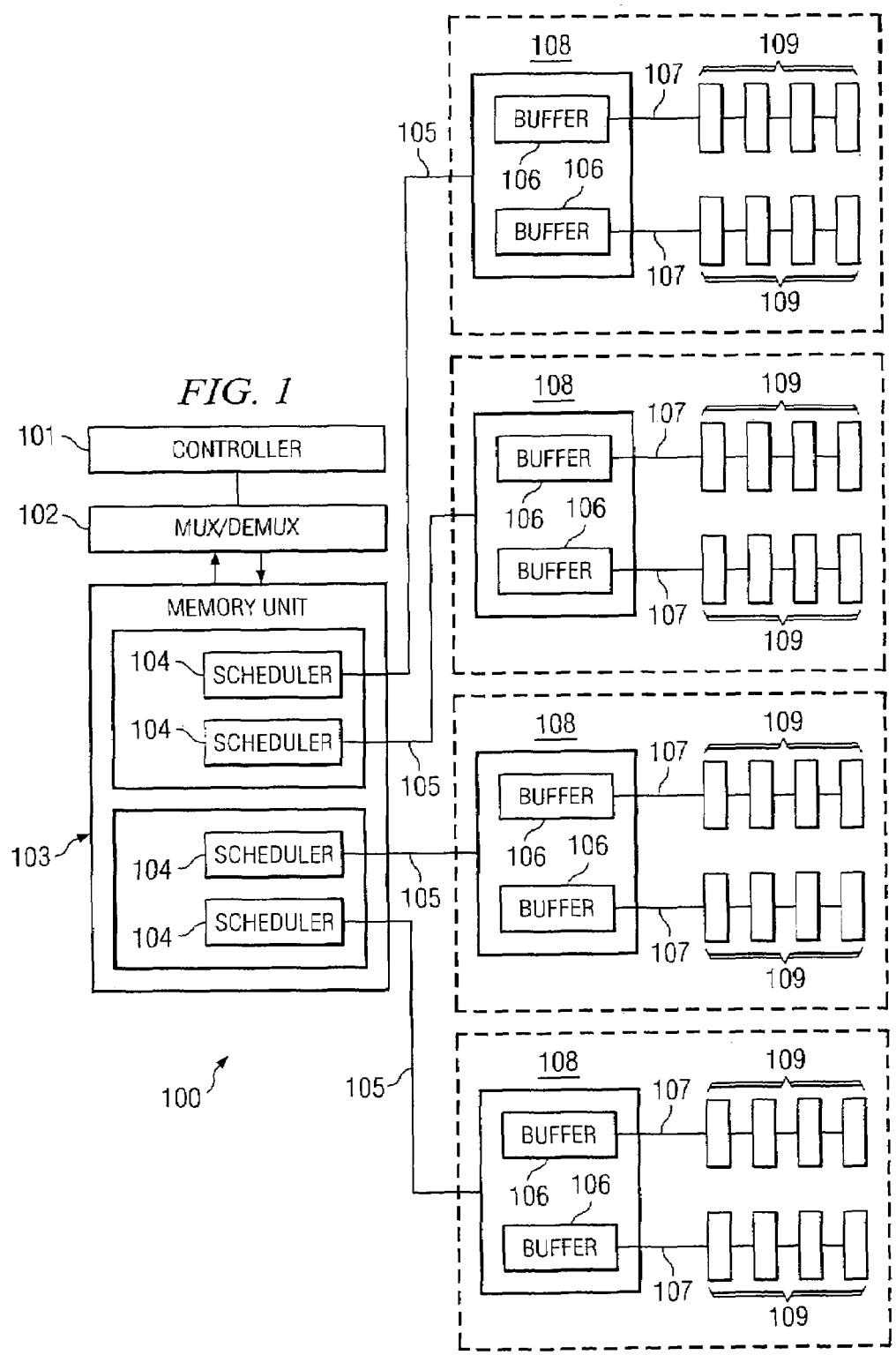
FIG. 1 depicts a memory system that implements an ECC algorithm that may be validated by representative embodiments.

FIG. 1 depicts system 100 in which representative embodiment may provide a ECC validation mechanism. Controller 101 as shown in FIG. 1 may store and retrieve cache data for cache lines received from processors (not shown) in a distributed shared memory architecture. Controller 101 may utilize an ECC algorithm, such as a suitable Reed-Solomon code, to detect and/or correct errors associated with data stored in memory. The error correcting functionality of controller 101 may implement an ECC algorithm utilizing standard logic designs. Specifically, the ECC functionality of controller 101 may be implemented utilizing XOR trees, shift-registers, look-up tables, and/or other logical elements.

Controller 101 may store and retrieve data to and from memory quadrants 108. Controller 101 communicates cache data through multiplexer/demultiplexer (MUX/DEMUX) 102 and memory unit 103. Memory unit 103 comprises a plurality of schedulers 104 to schedule access to memory quadrants 108 through quadrant buses 105.

Furthermore, according to representative embodiments, each one of quadrants 108 includes a pair of memory buffers 106. Each memory buffer 106 may be coupled to a respective DRAM bus 107. Also, four logical memory ranks 109 may be coupled to each DRAM bus 107. Memory ranks 109 may be implemented utilizing two double-sided dynamic random access memory (DRAM) dual in-line memory modules (DIMMs). Each memory rank 109 of one embodiment includes a plurality of DRAM components (not shown) within respective DIMMs.

Figure 2:
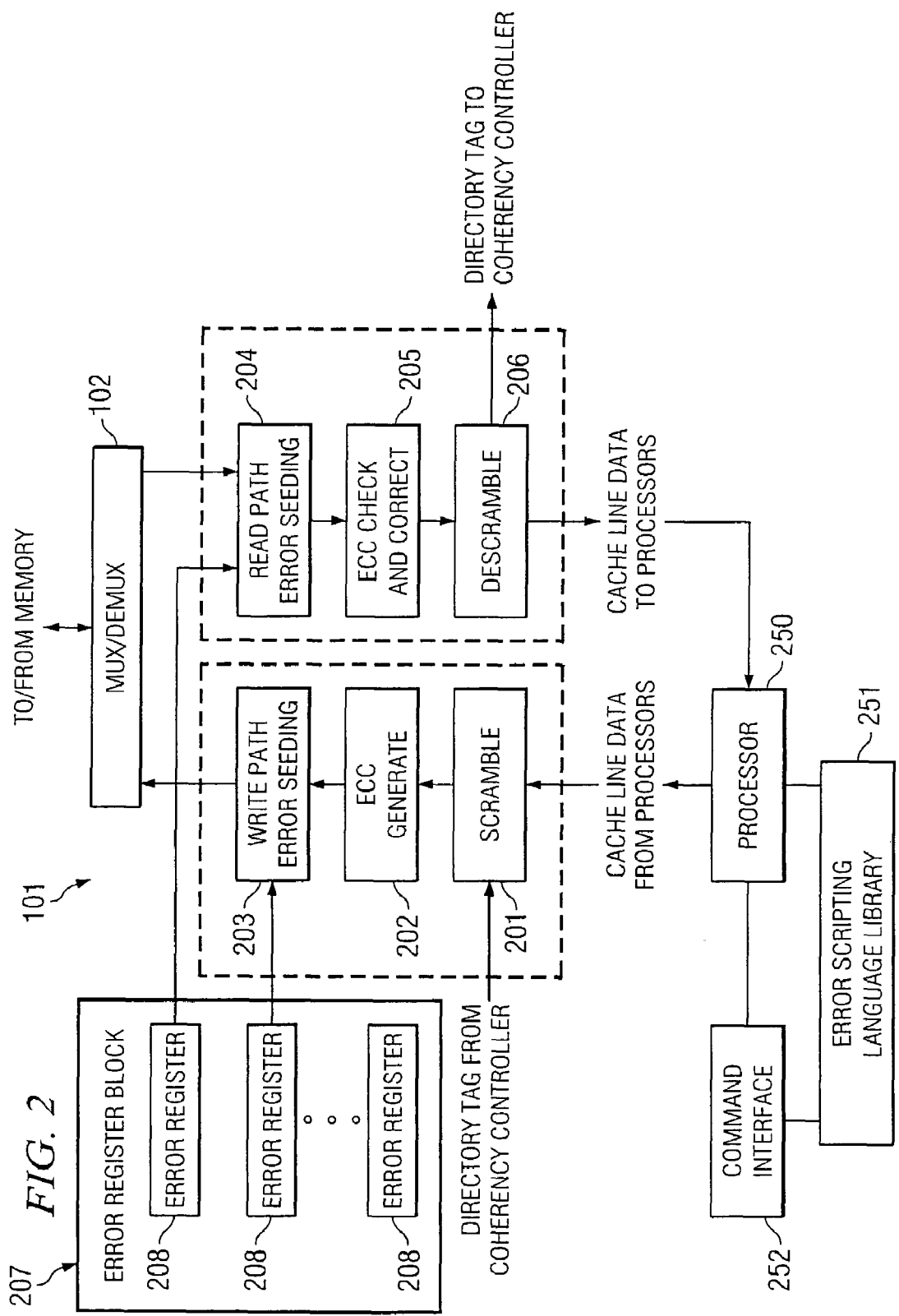
FIG. 2 depicts a memory controller that implements an ECC algorithm that may be validated by representative embodiments.

FIG. 2 depicts memory controller 101, in greater detail, including error seeding functionality to facilitate validation of the robust error correction functionality implemented according to representative embodiments. When cache data is received from a processor (such as processor 250) via a suitable interconnect, memory controller 101 may segment the cache data and associated tag data from a coherency controller (not shown) into a plurality of portions in scramble block 201. In representative embodiments, scramble block 201 may segment a cache line and associated tag data to be embedded into four ECC code words. ECC code words may be generated for the segmented cache data and tag data in ECC generate block 202. After generation of a respective ECC code word, write path error seeding block 203 may selectively insert data errors into the ECC code word depending upon the values loaded into selected error registers 208 of error register block 207. The values loaded in error registers 208 may define the location of errors, the number of errors, the error patterns, and/or the like. Values may be loaded into error registers 208 utilizing an error scripting language command as will be discussed in greater detail below. Each ECC code word with the inserted error(s) is then communicated to MUX/DEMUX 102 to be stored within a logical rank 109 of the memory.

When memory controller 101 retrieves an ECC code word from memory, read path error seeding block 204 may insert errors into the retrieved data according to selected error registers 208 of error register block 207. ECC check and correction block 205 performs error detection and correction according to the appropriate ECC algorithm. ECC check and correction block 205 may perform error correction for an ECC code word according to the multiple modes (parity check, single-bit detection/correction, two adjacent bit error detection/correction, single byte-error detection/correction, and/or the like). Descramble block 206 reassembles the data from ECC check and correction block 205 into a cache line for communication to a processor and into tag data for communication to the coherency controller.

For further details regarding how to implement controllable error insertion in response to register values, the reader is referred to U.S. patent application Ser. No. 10/435,149, entitled "SYSTEMS AND METHODS FOR PROVIDING ERROR CORRECTION CODE TESTING FUNCTIONALITY."

When an ECC algorithm validation test is to occur, a user or a suitable program may provide an error scripting language to error command interface 252 (e.g., software instructions defining operations of processor 250 stored in computer readable memory, e.g., memory). The received command may be passed to error scripting language library 251 (also, software instructions defining operations of processor 250 stored in computer readable memory, e.g., memory). Error scripting language library 251 parses the command to obtain the validation parameters. According to the validation parameters, error scripting language library 251 sets appropriate error registers 208 to appropriate values. Error scripting language library 251 may cause data to be communicated through controller 101 and thereby be corrupted according to the parameters of the command. Error scripting language library 251 may then retrieve the data and determine whether the inserted errors were detected and/or corrected as expected. Error scripting language library 251 may then utilize command interface 252 to report the outcome of the validation test.

In representative embodiments, the error scripting language defines a command to corrupt data communicated across a given bus of the form: corruptBus(bus_id, [initial_bit:ending_bit]:min-max . . . [initial_bit:ending_bit]:min-max, total_errors). The term "corruptBus" identifies the command type. The terms "[initial_bit,ending_bit]" define the beginning and ending of a bit field in which errors are to be inserted. The terms "min-max" respectively define the minimum and maximum number of errors to be inserted into the respective bit field. The term "total_error" defines the total number of errors to be inserted over all of the defined bit fields. Invalid min/max criteria may be detected by the following conditions: (i) if the sum of all of the minimums is greater than the total number of bits to corrupt, then the min/max criteria is invalid; and (ii) if the sum of all of the maximums is less than the total number of bits to corrupt, then the mix/max criteria is invalid.

The command corruptBus(01, [31:29]:1-2 [26:24] [16:14], 3) may be utilized as an example, The term "01" indicates that data communicated via bus "01" is to be corrupted. The terms "[31:29]:1-2" indicates that at least one bit error but no more than two bit errors are to be inserted within bits 31-29 (inclusive). The term "3" indicates that a total of three bits are to be inserted. The additional bit errors (i.e., either one or two errors depending upon the number inserted into bits 31-29) are to be randomly inserted within bits 26-24 and 16-14, because no minimum or maximum criteria have been set for those bit fields.

Figure 3:
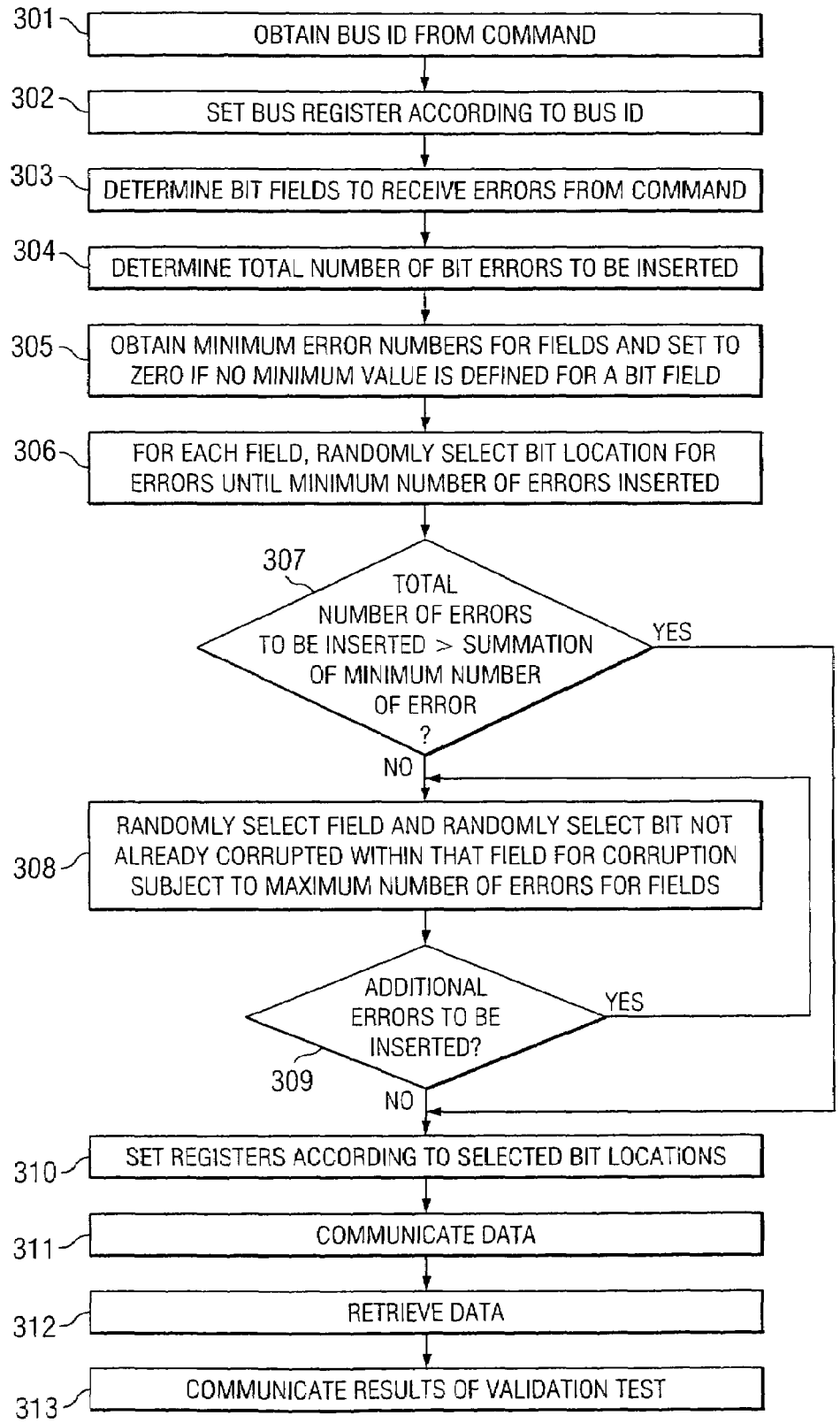
FIG. 3 depicts a flowchart for validating an ECC algorithm according to representative embodiments.

FIG. 3 depicts a flowchart for inserting errors into bit fields according to representative embodiments. The flowchart of FIG. 3 may be implemented, for example, as software instructions or code executable by a suitable processor. The software instructions or code may be stored on any suitable computer readable medium such as computer memory, magnetic media, optical media, and/or the like.

In step 301, the bus ID is obtained from the busCorrupt command. In step 302, the bus register is set according to the obtained bus ID. In step 303, the bit fields to received errors are determined from the command. In step 304, the total number of bit errors is determined from the command. In step 305, the minimum number of errors for the fields are obtained and if no minimum number is specified for a field, its minimum number is set to zero. In step 306, for each field, bit locations are randomly selected until the minimum number of errors are inserted.

In step 307, a logical determination is made to determine whether the total number of errors to be inserted is greater than the summation of the minimum errors to be inserted for the respective fields. If not, the process flow proceeds to step 310. If the total number of errors is greater, the process flow proceeds to step 308. In step 308, a field is randomly selected and a bit within that field that is not already corrupted is selected for corruption (subject to the maximum number of errors for the respective fields). In step 309, a logical determination is made to determine whether additional errors are to be inserted as defined by the total number of errors. If there are, the process flow returns to step 308. If not, the process flow proceeds to step 310.

In step 310, the registers are set according to the selected bit locations. In step 311, data is communicated to memory utilizing a suitable controller and, thereby, errors are inserted as defined by the values set in the registers. In step 312, the corrupted data is retrieved and the controller attempts to detect and/or correct the inserted errors. In step 313, the results of the validation test (i.e., whether the controller detected and/or corrected the data as expected) is communicated. For example, error detection may be expected for a given bit field and error detection and correction may be expected for another bit field. Both of these conditions may be validated by representative embodiments.

Representative embodiments may provide a number of advantages. For example, it may be advantageous to utilize multiple error detection/correction algorithms for a particular group of data stored in memory. For example, a field of a cache line may be associated with an error correction code that enables up to two adjacent bit errors to be corrected while another field within the same cache line may be associated with parity data to enable the detection of a single bit error. Accordingly, representative embodiments facilitates testing of error detection and correction with these fields in a manner appropriate for the respective codes by enabling constraints to be specified on a per-field basis. Furthermore, with the min/max notation, the bits are selected on a randomized basis within the specified fields. By running multiple tests utilizing the same field and min/max criteria in, for example, a regression suite, maximum testing coverage may be ensured.

What is claimed is:

1. A method for inserting errors into data to facilitate validation of an error detection algorithm, comprising:
   receiving a data corruption command for a plurality of bits;
   determining, from said data corruption command, a plurality of bit fields within said plurality of bits for data corruption;
   determining a minimum and maximum number of errors for each of said plurality of bit fields;
   determining a total number of errors to be inserted;
   inserting said minimum number of errors into each of said plurality of bit fields at random locations; and
   randomly inserting additional errors into said plurality of bit fields subject to said maximum number of errors until said total number of errors are inserted.

2. The method of claim 1 further comprising:
   identifying a bus from said data corruption command, wherein said inserting and said randomly inserting occurs in association with communication of data over said bus.

3. The method of claim 2 wherein said bus is located between a memory controller and a plurality of memory components.

4. The method of claim 3 wherein said plurality of bits are cache line data processed by said memory controller.

5. The method of claim 4 further comprising:
   writing a cache line to said plurality of memory components via said memory controller;
   retrieving said cache line; and
   determining whether said memory controller detected errors inserted into said plurality of bits.

6. The method of claim 5 further comprising:
   determining whether said memory controller corrected errors inserted into said plurality of bits.

7. The method of claim 6 wherein error detection is applied by said memory controller to a first bit field of said plurality of bit fields and error detection and error correction are applied by said memory controller to a second bit field of said plurality of bit fields.

8. A computer readable medium including executable instructions for identifying errors to facilitate validation of an error detection algorithm, comprising:
   code for receiving a data corruption command for a plurality of bits;
   code for determining, from said data corruption command, a plurality of bit fields within said plurality of bits for data corruption;
   code for determining a minimum and maximum number of errors for each of said plurality of bit fields;
   code for determining a total number of errors;
   code for randomly identifying locations for errors in each of said plurality of bit fields according to said minimum numbers of errors; and
   code for randomly identifying additional locations for errors in said plurality of bit fields subject to said maximum number of errors until said total number of errors are identified.

9. The computer readable medium of claim 8 further comprising:
   code for setting values of registers of a controller to cause errors to be inserted into identified locations.

10. The computer readable medium of claim 9 further comprising:
    code for identifying a bus of said plurality of buses from said data corruption command; and
    code for setting a register of said controller to a value to cause said corruption of data communicated over said identified bus according to identified locations.

11. The computer readable medium of claim 10 further comprising:
    code for communicating data to be stored in memory by said controller across said bus; and
    code for retrieving said stored data.

12. The computer readable medium of claim 11 further comprising:
    code for determining from said retrieved data whether said controller corrects errors inserted into said identified locations.

13. The computer readable medium of claim 11 further comprising:
    code for determining from said retrieved data whether said controller detects errors inserted into said identified locations.

14. A system for identifying errors to facilitate validation of an error detection algorithm, comprising:
    means for receiving a data corruption command for a plurality of bits;
    means for determining, from said data corruption command, a plurality of bit fields within said plurality of bits for data corruption;
    means for determining a minimum and maximum number of errors for each of said plurality of bit fields;
    means for determining a total number of errors;
    means for randomly identifying locations for errors in each of said plurality of bit fields according to said minimum numbers of errors; and
    means for randomly identifying additional locations for errors in said plurality of bit fields subject to said maximum number of errors until said total number of errors are identified.

15. The system of claim 14 further comprising:
    means for setting values of registers of a controller to cause errors to be inserted into identified locations.

16. The system of claim 15 wherein said controller stores cache line data into a plurality of memory components over a plurality of buses.

17. The system of claim 16 further comprising:
- means for identifying a bus of said plurality of buses from said data corruption command; and
- means for setting a register of said controller to a value to cause said corruption of data communicated over said identified bus according to identified locations.

18. The system of claim 17 further comprising:
- means for communicating data to said controller to be written to said plurality of memory components over said identified bus;
- means for retrieving said data; and
- means for determining whether said controller detected errors inserted into said plurality of bits.

19. The system of claim 18 further comprising:
- means for determining whether said controller corrected errors inserted into said plurality of bits.

20. The system of claim 19 wherein error detection is applied by said controller to a first bit field of said plurality of bit fields and error detection and error correction are applied by said controller to a second bit field of said plurality of bit fields.

* * * * *

UNITED STATES PATENT AND TRADEMARK OFFICE
CERTIFICATE OF CORRECTION

PATENT NO. : 7,401,269 B2  Page 1 of 1
APPLICATION NO. : 10/435147
DATED : July 15, 2008
INVENTOR(S) : Sahir S. Hoda et al.

It is certified that error appears in the above-identified patent and that said Letters Patent is hereby corrected as shown below:

Title Pg, Item (75), under "Inventors", after "Hoda," delete "Dallas" and insert -- Richardson --, therefor.

Signed and Sealed this

Fourteenth Day of October, 2008

JON W. DUDAS
*Director of the United States Patent and Trademark Office*